United States Patent
Waldrop, III et al.

(10) Patent No.: US 10,479,520 B2
(45) Date of Patent: Nov. 19, 2019

(54) COMPOSITE STRUCTURE ASSEMBLY HAVING AN INTERCONNECTED LAYERED CORE

(71) Applicant: THE BOEING COMPANY, Chicago, IL (US)

(72) Inventors: John C. Waldrop, III, Saint Peters, MO (US); Zachary Benjamin Renwick, St. Louis, MO (US); Matthew Scott Thompson, O'Fallon, MO (US); Michael William Hayes, Belleville, IL (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 15/604,697

(22) Filed: May 25, 2017

(65) Prior Publication Data

US 2018/0339785 A1 Nov. 29, 2018

(51) Int. Cl.
*B32B 3/12* (2006.01)
*F02C 7/045* (2006.01)
(Continued)

(52) U.S. Cl.
CPC ............... *B64D 33/02* (2013.01); *B32B 3/12* (2013.01); *B32B 7/08* (2013.01); *B32B 7/12* (2013.01); *B32B 27/08* (2013.01); *B32B 27/12* (2013.01); *B32B 27/285* (2013.01); *B32B 27/286* (2013.01); *B32B 27/288* (2013.01); *B32B 27/34* (2013.01); *B32B 37/0076* (2013.01);
(Continued)

(58) Field of Classification Search
CPC ............ B64D 33/02; B64D 2033/0206; B64D 2033/0213; E04B 2001/748; E04B 1/84; E04B 1/82; B32B 3/12; B32B 37/0076; F02C 7/045; F02K 1/827; G10K 11/172; G10K 11/16
See application file for complete search history.

(56) References Cited

U.S. PATENT DOCUMENTS 3,439,774 A * 4/1969 Callaway ................ F02K 1/827
181/222
3,910,374 A * 10/1975 Holehouse ........... G10K 11/172
181/292
(Continued)

FOREIGN PATENT DOCUMENTS

DE 2423013 A1 * 11/1975 ............... E04B 1/86
EP 2662207 11/2013
(Continued)

OTHER PUBLICATIONS

Extended European Search Report for EP 18167287.4-1107, dated Sep. 19, 2018.

*Primary Examiner* — Edgardo San Martin
(74) *Attorney, Agent, or Firm* — Joseph M. Butscher; The Small Patent Law Group, LLC

(57) ABSTRACT

A composite structure assembly and method of forming a composite structure assembly is provided. The composite structure assembly includes a composite core including a first cell layer having a plurality of first cells and a second cell layer having a plurality of second cells. The first cell layer is adjacent to the second cell layer. The plurality of first cells are fluidly interconnected with the plurality of second cells.

22 Claims, 6 Drawing Sheets

(51) Int. Cl.
*G10K 11/168* (2006.01)
*B64D 33/02* (2006.01)
*B32B 7/08* (2019.01)
*B32B 37/00* (2006.01)
*B64D 27/16* (2006.01)
*B32B 7/12* (2006.01)
*B32B 27/08* (2006.01)
*B32B 27/12* (2006.01)
*B32B 27/28* (2006.01)
*B32B 27/34* (2006.01)
*B32B 3/10* (2006.01)
*F02C 7/00* (2006.01)

(52) U.S. Cl.
CPC ........ *B64D 27/16* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2305/024* (2013.01); *B32B 2307/102* (2013.01); *B32B 2307/724* (2013.01); *B32B 2307/726* (2013.01); *B32B 2605/18* (2013.01); *B64D 2033/0206* (2013.01)

(56) References Cited

U.S. PATENT DOCUMENTS

| | | | |
|---|---|---|---|
| 4,084,366 A * | 4/1978 | Saylor | B29D 24/005 52/791.1 |
| 4,749,150 A * | 6/1988 | Rose | B64C 21/06 181/214 |
| 5,460,865 A * | 10/1995 | Tsotsis | B32B 3/12 428/116 |
| 6,767,606 B2 * | 7/2004 | Jackson | B32B 3/28 156/250 |
| 7,735,600 B2 * | 6/2010 | Strunk | F02C 7/045 181/210 |
| 8,931,588 B2 * | 1/2015 | Murray | F02K 3/06 181/214 |
| 9,321,241 B2 * | 4/2016 | Doty | B32B 3/12 |
| 9,500,131 B2 * | 11/2016 | Richter | B64D 33/02 |
| 10,174,675 B2 * | 1/2019 | Martinez | F04D 29/664 |
| 2004/0126537 A1 | 7/2004 | Jackson | |
| 2005/0042416 A1 * | 2/2005 | Blackmon | B32B 3/12 428/116 |
| 2010/0108435 A1 * | 5/2010 | Valleroy | G10K 11/172 181/214 |
| 2012/0031957 A1 * | 2/2012 | Whitaker | B32B 3/12 229/103.11 |

FOREIGN PATENT DOCUMENTS

| EP | 2786862 | 10/2014 |
|---|---|---|
| WO | WO 93/02853 | 2/1993 |

\* cited by examiner

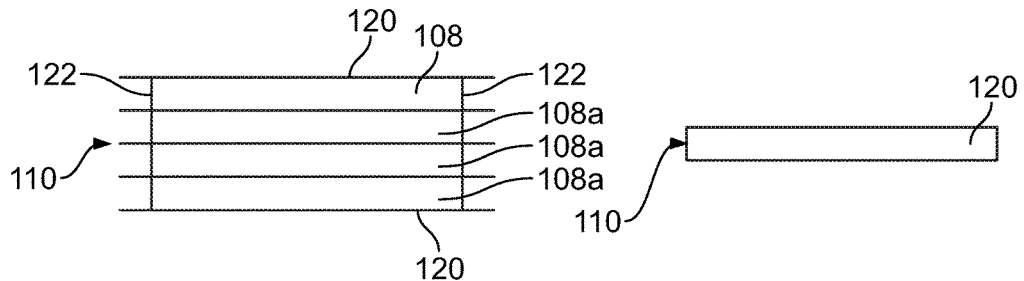
FIG. 3  FIG. 4
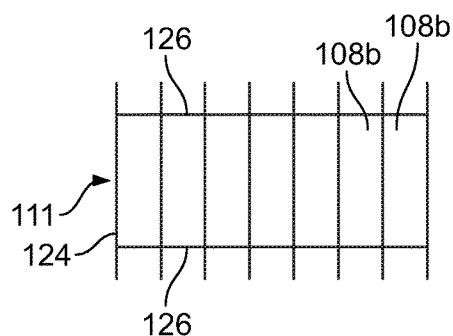 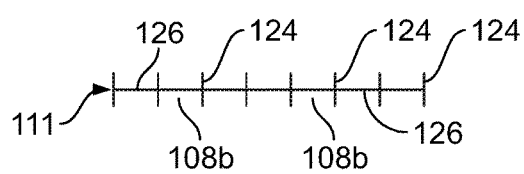
FIG. 5  FIG. 6
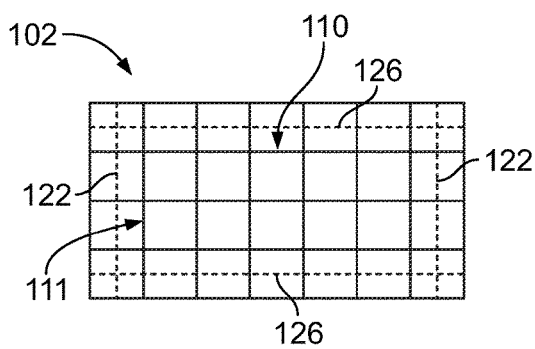 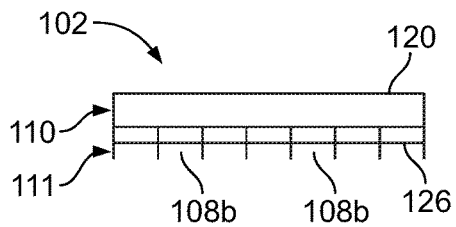
FIG. 7  FIG. 8

COMPOSITE STRUCTURE ASSEMBLY HAVING AN INTERCONNECTED LAYERED CORE

FIELD OF EMBODIMENTS OF THE DISCLOSURE

Embodiments of the present disclosure generally relate to composite structure assemblies, and more particularly, to composite structure assemblies including cores having interconnected layers of core cells.

BACKGROUND OF THE DISCLOSURE

Jet aircraft typically include one or more engines that may generate high levels of noise. For example, a fan case within a housing secured to a wing of an aircraft typically generates noise. Often, engine housings include one or more sound dampening structures that are used to absorb at least a portion of the noise generated by components of an engine. As an example, an acoustic inlet barrel may be positioned at or proximate to an inlet of the engine housing upstream from a fan case. Certain known acoustic inlet barrels are formed of composite materials, such as carbon-reinforced plastics, that are sandwiched around an acoustic core.

A composite structure may include panels that are fabricated with honeycomb or foam cores. A honeycomb core is structurally efficient, but may be expensive to produce. In particular, a honeycomb core may be formed through various processes that are labor and time intensive. In general, the core is cut, bonded, milled to contour, and formed.

Typically, the honeycomb core cells extend between opposite surfaces of the core. Each cell includes one or more walls that separate the particular cell from adjacent cells. That is, internal chambers of the cells are isolated from one another. As such, fluid (such as gas or liquid) is unable to flow between the cells.

In certain scenarios, however, fluid may be undesirably trapped within core cells. For example, water may be trapped within a core cell. The trapped water may be unable to drain from the core cell, such as if the core cell is secured between outer skins.

As another example, during a manufacturing process of portions of an aircraft (such as a military helicopter), a gas such as Nitrogen may be used to provide an inert seal in relation to a composite structure assembly. As such, separate and distinct forming processes (such as cutting holes through cells) may be used to ensure that the gas is able to flow between the cells and/or to equalize fluid pressure between the cells. As can be appreciated, the separate and distinct forming process adds time and cost to the manufacturing process.

SUMMARY OF THE DISCLOSURE

Certain embodiments of the present disclosure provide a composite structure assembly includes a composite core including a first cell layer having a plurality of first cells and a second cell layer having a plurality of second cells. The first cell layer is adjacent to the second cell layer. The plurality of first cells are fluidly interconnected with the plurality of second cells.

In at least one embodiment, each of the plurality of first cells is in fluid communication with at least two of the plurality of second cells, and each of the plurality of second cells is in fluid communication with at least two of the plurality of first cells.

In at least one embodiment, the first cell layer is offset with respect to the second cell layer. For example, the first cell layer may be rotationally offset with respect to the second cell layer. As another example, the first cell layer may be linearly offset with respect to the second cell layer. As yet another example, the first cell layer may be offset with respect to the second cell layer through a difference in one of both of shape or size between the plurality of first cells and the plurality of second cells.

The first cell layer may include a plurality of first cross members that define the plurality of first cells. The first cross members may be parallel to one another. The second cell layer may include a plurality of second cross members that define the plurality of second cells. In at least one embodiment, the plurality of first cross members are perpendicular to the plurality of second cross members. In at least one other embodiment, the plurality of first cross members are linearly shifted in relation to the plurality of second cross members. Each of the plurality of first cross members may differ in one or both of size or shape from each of the plurality of cross members.

In at least one embodiment, a plurality of connecting beams connect the first cell layer to the second cell layer.

The plurality of first cells may be staggered in relation to the plurality of second cells to provide increased structural support for a skin. The composite structure assembly may include at least one skin secured to the composite core.

Certain embodiments of the present disclosure provide a method of forming a composite structure assembly. The method includes forming a first cell layer having a plurality of first cells, forming a second cell layer having a plurality of second cells, and securing the first cell layer to the second cell layer to form a composite core. The first cell layer is adjacent to the second cell layer. The securing fluidly interconnects the plurality of first cells with the plurality of second cells.

BRIEF DESCRIPTION OF THE DRAWINGS

The foregoing summary, as well as the following detailed description of certain embodiments, will be better understood when read in conjunction with the appended drawings.

FIG. 3 illustrates a top view of a first cell layer that can be used with the core of FIG. 3.

FIG. 4 illustrates a lateral view of a first cell layer that can be used with the core of FIG. 3.

FIG. 5 illustrates a top view of a second cell layer that can be used with the core of FIG. 3.

FIG. 6 illustrates a lateral view of a second cell layer that can be used with the core of FIG. 3.

FIG. 7 illustrates a top view of a core that can be used with the composite structure assembly of FIG. 1.

FIG. 8 illustrates a lateral view of a core that can be used with the composite structure assembly of FIG. 1.

DETAILED DESCRIPTION OF THE DISCLOSURE

Described herein is a composite structure assembly that allows fluid to flow between core cells. Further, the composite structure assembly described herein allows for fluid drainage therethrough. The disclosure provides an efficient system and method of forming a composite structure assembly that allows for fluid flow between cells. More specifically, embodiments and examples of the present disclosure provide a composite structure assembly including a core having a plurality of interconnected cells. The interconnected cells allow fluid (such as liquid and gas) to flow therebetween. In at least one embodiment, the core includes multiple cell layers. Adjacent cell layers (for example, cell layers stacked directly onto one another) define internal chambers that are in fluid communication with one another.

In at least one embodiment or example, the core is formed from offset truss networks that are used to provide sandwich core assemblies that may be used in aerospace and industrial applications. The cells may be of various shapes and sizes. For example, cross-sections of the cells may be rectangular, hexagonal, triangular, circular, or various other shapes. The sizes of the cells may be uniform or varied throughout the core. In at least one embodiment, the cells in adjacent layers are offset from one another, thereby allowing fluid communication between the cells. The offset distance and frequency may be uniform or varied throughout the core.

Certain embodiments or examples of the present disclosure provide a composite structure assembly that includes a core. In at least one embodiment, the core includes a first set of first cross members. The first cross members are parallel to one another. The composite core also includes a second set of second cross members. The second cross members are parallel to one another, but not parallel to the first cross members. For example, the first cross members may be perpendicular to the second cross members. In at least one embodiment, the first set of first cross members overlays the second set of second cross members, or vice versa, thereby offsetting the first cross members relative to the second cross members. In at least one embodiment, an additive manufacturing process (such as fused filament fabrication, selective laser sintering, stereolithography, or the like) may be used to form a core of the composite structure assembly.

Figure 1:
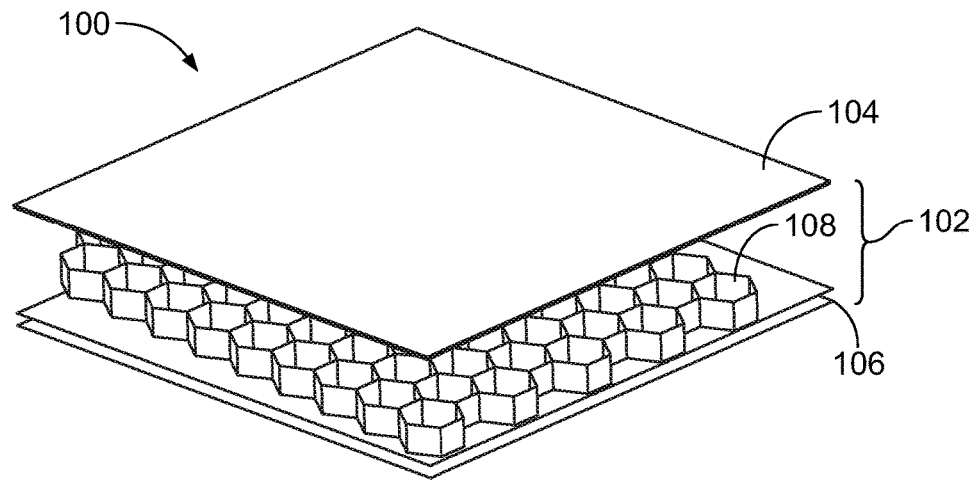
FIG. 1 illustrates a perspective exploded view of composite structure assembly, according to an embodiment of the present disclosure.

FIG. 1 illustrates a perspective exploded view of composite structure assembly 100, according to an embodiment of the present disclosure. The composite structure assembly 100 includes a composite core 102 (such as an acoustic core) sandwiched between opposed first skin 104 and second skin 106. The core 102 includes a plurality of cells 108. The cells 108 may be formed in layers that are sandwiched together. For example, a first cell layer of cells overlays a second cell layer of cells, which overlays a third layer of cells, and the like.

The core 102, including the cells 108 may be formed of fiber-reinforced, particle-filled, or unfilled thermoplastic polymers, and the like. As non-limiting examples, the core 102 may be formed of thermoplastics such as polyamide (PA), polyphenylene sulfide (PPS), polyether ether ketone (PEEK), polyether ketone ketone (PEKK), polyetherimide (PEI), polyphenylsulfone (PPSU), polyethersulfone (PES), thermoplastic polyimide (TPI), liquid crystalline polymer (LCP), polyamide-imide (PAT), or the like. The core 102 may be formed of thermoplastics containing carbon fibers, glass fibers, mineral fillers, nanomaterial fillers, thermal stabilizing additives, flame retardants, or the like. The core 102 may include more or fewer cells 108 than shown. Further, the core 102 may be shaped differently than shown.

The core 102 may be formed by depositing the layers of cells on a flat surface. For example, a first cell layer of cells may be deposited. A second cell layer of cells may then be deposited over the second cell layer of cells. The cell layers may then be melt fused together to provide a unitary core structure. The cell layers may be deposited using an additive manufacturing process (such as fused filament fabrication, selective laser sintering, stereolithography, or the like).

The first and second skins 104 and 106 may be or include one or more pre-impregnated epoxy resin layers that include fibers, such as fiberglass, quartz, graphite, KEVLAR®, and/or the like. The first and second skins 104 and 106 may be identical to one another. In at least one other embodiment, the first and second skins 104 and 106 may include more or fewer layers than one another.

The core 102 and the skins 104 and 106 may be securely sandwiched together through one or more adhesives, fasteners, wraps, films, and/or the like. Optionally, the composite structure assembly 100 may include fewer than both of the skins 104 and 106. In at least one embodiment, the composite structure 100 may not include the skins 104 and 106.

The core 102 may include more than two layers of cells. Additional layers of cells may be adjacent to first and/or second layers of cells. The layered structure may be repeated. Each of the plurality of cells in a layer may be in fluid communication with a plurality of cells in each adjacent layer of cells.

The composite structure assembly 100 may include more components than shown. For example, the composite structure assembly 100 may include a cover (not shown), such as a laminate sheet. As another example, the composite structure assembly 100 may include one or more electronic components mounted therein, or positioned thereon.

Figure 2:
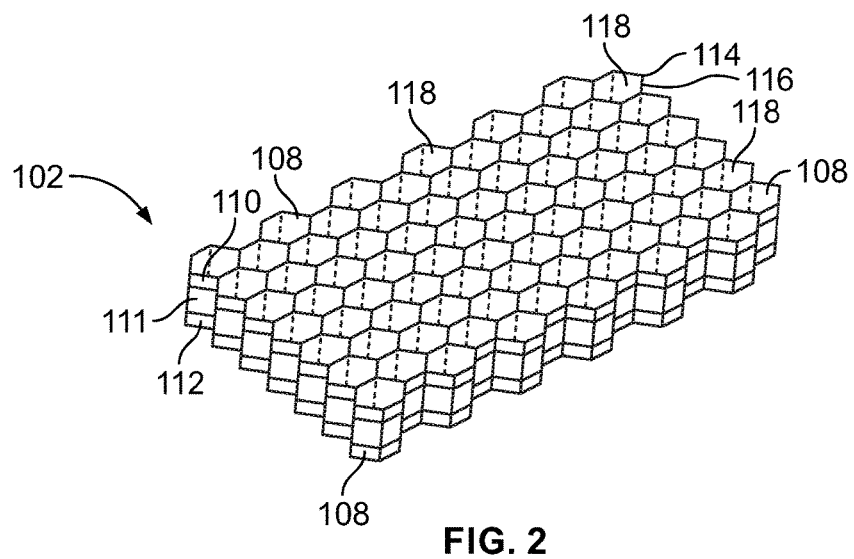
FIG. 2 illustrates a perspective top view of a core that can be used with the composite structure assembly of FIG. 1.

FIG. 2 illustrates a perspective top view of the core 102 that can be used with the composite structure assembly 100 (shown in FIG. 1). As shown, the core 102 includes a honeycomb structure having a plurality of cell layers 110, 111, and 112 including a plurality of cells 108, such as honeycomb-shaped cells Alternatively, the cells 108 may be various other shapes, such as circles (for example, cylinders having circular cross sections), squares, triangles, pentagons, octagons, or the like.

Each cell 108 includes a main body 114, such as a column, formed by outer walls 116. An internal chamber 118 may be defined between the walls 116 of each main body 118. An acoustic dampener (not shown) may be disposed within the internal chamber 118. Examples of acoustic dampeners include septums within cells 108, foam inserts, baffles, elastomeric materials, and the like.

As shown, the first cell layer 110 is disposed over the second cell layer 111, which, in turn, is disposed over the third cell layer 112. The first cell layer 110 is directly stacked over the second cell layer 111, which, in turn, is directly stacked over the third cell layer 112. As such, the first and second cell layers 110 and 111 are adjacent to one another, while the second and third cell layers 111 and 112 are adjacent to one another.

The adjacent cell layers 110 and 111, and the adjacent cell layers 111 and 112 are offset (for example, staggered, out-of-phase, or otherwise not axially aligned) with one another. That is, the cells 108 of the first cell layer 110 are misaligned with respect to the cells 108 of the second cell layer 111, such that the main bodies 114 of the cells 108 of the adjacent layers 110 and 111 are misaligned (for example, not coaxial) with one another. Similarly, cells 108 of the second cell layer 111 are misaligned with respect to the cells 108 of the third cell layer 112. As such, the internal chamber 118 of a cell 108 of the first cell layer 110 is in fluid communication with the internal chambers 118 of at least two cells 108 of the second cell layer 111. Similarly, the internal chamber 118 of a cell 108 of the second cell layer 111 is in fluid communication with internal chambers 118 of at least two cells 108 of the third cell layer 112. In this manner, the offset nature of the adjacent cell layers 110 and 111 (and 111 and 112) provides fluid paths between internal chambers 118 of cells 108 of the core 102. As such, the cells 108 of different cell layers are in fluid communication with one another.

The core 102 may include more or fewer cell layers than shown. For example, the core 102 may include only two cell layers. As another example, the core 102 may include four or more cell layers. Further, each cell layer may include more or fewer cells 108 than shown. Also, the cell layers may be sized and shaped differently than shown.

As shown, each cell layer 110, 111, and 112 may include hexagonal cells 108. The cells 108 may be uniform in size and shape. Optionally, at least two of the cells 108 may differ in size and shape.

As an example, the first cell layer 110 may include hexagonal cells 108, while the second cell layer 111 may include rectangular cells. The third cell layer 112 may include cells 108 shaped as hexagons, rectangles, or various other shapes.

FIG. 3 illustrates a top view of the first cell layer 110 that can be used with the core 102 (shown in FIG. 2). FIG. 4 illustrates a lateral view of the first cell layer 110. Referring to FIGS. 3 and 4, the first cell layer 110 includes a plurality of cross members 120 (such as brackets, trusses, fins, straps, beams, walls, or the like) that are parallel to one another. The first cell layer 110 may include more or fewer cross members 120 than shown. Connecting beams 122 (such as beams perpendicularly-oriented to the cross members 120) may secure the cross members 120 together. More or fewer connecting beams 122 than shown may be used. The connecting beams 122 may be sized and shaped the same as the cross members 120. Optionally, the connecting beams 122 may be smaller than the cross members 120. For example, the connecting beams 122 may be thin, rod like structures that tie the cross members 120 together. Optionally, the first cell layer 110 may not include the connecting beams 122. Cells 108a are defined between adjacent cross members 120 and/or adjacent connecting beams 122.

FIG. 5 illustrates a top view of the second cell layer 111 that can be used with the core 102 (shown in FIG. 2). FIG. 6 illustrates a lateral view of the second cell layer 111. Referring to FIGS. 5 and 6, the second cell layer 111 includes a plurality of cross members 124 (such as brackets, trusses, fins, straps, beams, walls, or the like) that are parallel to one another. The second cell layer 111 may include more or fewer cross members 124 than shown. Connecting beams 126 (such as beams perpendicularly-oriented with respect to the cross members 124) may secure the cross members 124 together. More or fewer connecting beams 126 than shown may be used. The connecting beams 126 may be sized and shaped the same as the cross members 124. Optionally, the connecting beams 126 may be smaller than the cross members 124. For example, the connecting beams 126 may be thin, rod-like structures that tie the cross members 124 together. Optionally, the second cell layer 111 may not include the connecting beams 126. Cells 108b are defined between adjacent cross members 124 and/or adjacent connecting beams 126.

Referring to FIGS. 3-6, the first and second cell layers 110 and 111 are offset with respect to one another. In particular, the first and second cell layers 110 and 111 are perpendicular with respect to one another, such that the cross members 120 of the first cell layer 110 are ninety degrees out of alignment from the cross members 124 of the second cell layer 111. Optionally, the first and second cell layers 110 and 111 may be offset such that the angular difference between the respective cross members 120 and 124 is more or less than ninety degrees.

In at least one embodiment, the first and second cell layers 110 and 111 may be formed as identical structures, but offset from one another, as noted above. In at least one other embodiment, the first cell layer 110 may include more or fewer cells 108 than the second cell layer 111.

FIG. 7 illustrates a top view of a core 102 that can be used with the composite structure assembly 100 (shown in FIG. 1). The connecting beams 122 and 126 are shown as dashed lines in FIG. 7. FIG. 8 illustrates a lateral view of the core, 102. Referring to FIGS. 7 and 8, the first cell layer 110 is stacked directly onto the second cell layer 111, with the first and second cell layers 110 and 111 being offset with respect to one another (in this example, ninety degrees out of alignment with one another). As such, each cell 108a within the first cell layer 110 is in fluid communication with multiple cells 108b of the second cell layer 111, and vice versa. Additional cell layers may be mounted to the first cell layer 110 and/or the second cell layer 111 in a similar fashion.

Figure 9:
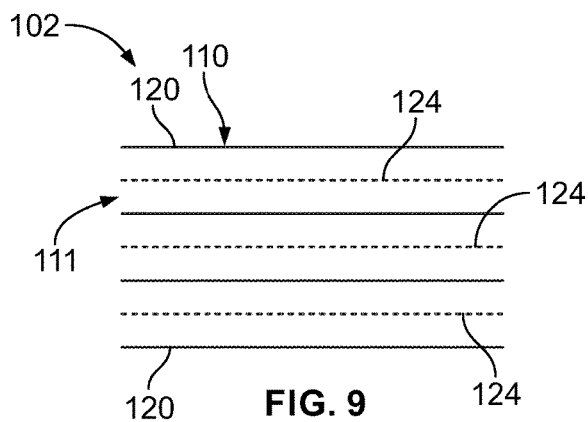
FIG. 9 illustrates a top view of a core that can be used with the composite structure assembly of FIG. 1.
Figure 10:
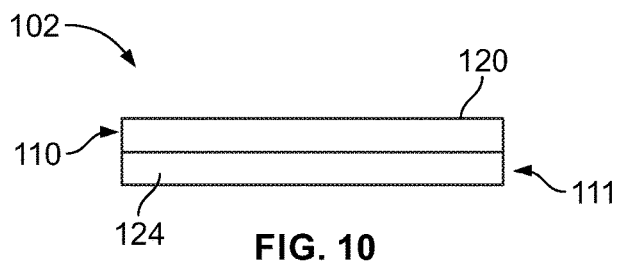
FIG. 10 illustrates a lateral view of a core that can be used with the composite structure assembly of FIG. 1.

FIG. 9 illustrates a top view of a core 102 that can be used with the composite structure assembly 100 (shown in FIG. 1). FIG. 10 illustrates a lateral view of the core 102. Referring to FIGS. 9 and 10, in this embodiment, the cross members 120 of the first cell layer 110 are parallel to the cross members 124 (shown as dashed lines in FIG. 9) of the second cell layer 111. Instead of being rotationally offset (for example, rotationally misaligned to provide an offset (as shown in FIGS. 3-8)), the first and second cell layers 110 and 111 are linearly offset. In particular, the first and second cell layers 110 and 111 are linearly shifted with respect to one another, such that the cross members 120 of the first cell layer 110 are positioned over cavities between cross members 124 of the second cell layer 111. Further, the cross members 124 of the second cell layer 111 are positioned under cavities between cross members 120 of the first cell layer 110. That is, the cross members 120 of the first cell layer 110 do not directly stack onto and over the cross members 124 o the second cell layer 111. Additional cell layers may be mounted to the first cell layer 110 and/or the second cell layer 111 in a similar fashion.

Figure 11:
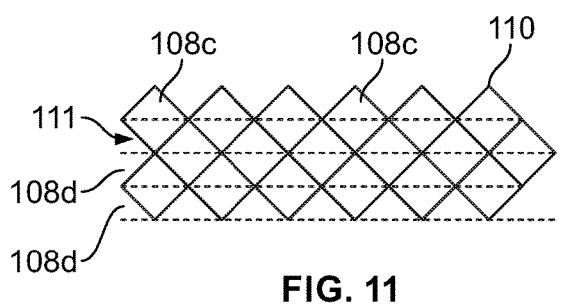
FIG. 11 illustrates a top view of a core that can be used with the composite structure assembly of FIG. 1.

FIG. 11 illustrates a top view of a core 102 that can be used with the composite structure assembly 100 (shown in FIG. 1). The core 102 includes a first cell layer 110 mounted over a second cell layer 111 (shown in dashed lines for clarity). In this embodiment, the first and second cell layers 110 and 111 are offset with respect to one another due to differences in cell shapes therebetween. The first cell layer 110 may include a plurality of diamond-shaped cells 108c, while the second cell layer 111 may include a plurality of rectangular-shaped cells 108d. Optionally, the cells 108d may be diamond-shaped, while the cells 108c may be rectangular. Optionally, the cells 108c and 108d may be various other shapes and sizes other than shown, such as triangular, hexagonal, circular, trapezoidal, or the like. As shown in FIG. 11, the offset between the first and second cell layers 110 and 111 is formed by differences in shapes and/or sizes of the cells 108c and 108d of the adjacent cell layers 110 and 111. Additional cell layers may be mounted to the first cell layer 110 and/or the second cell layer 111 in a similar fashion.

Figure 12:
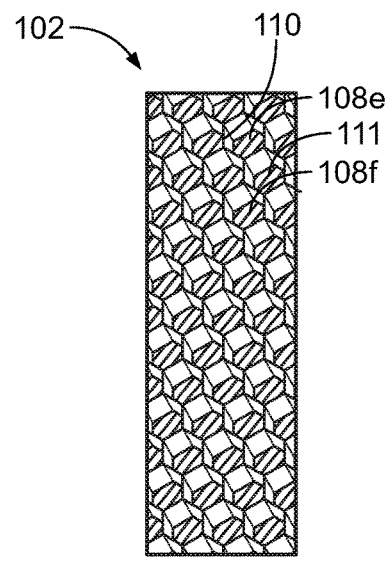
FIG. 12 illustrates a top view of a core that can be used with the composite structure assembly of FIG. 1.

FIG. 12 illustrates a top view of a core 102 that can be used with the composite structure assembly 100 (shown in FIG. 1). In this embodiment, the cells 108e of the first cell layer 110 are shaped as interconnected hexagons, while the cells 108f of the second cell layer 111 are shaped as interconnected rectangles.

Figure 13:
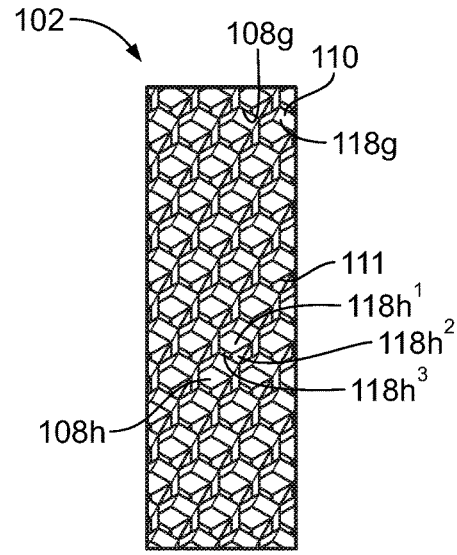
FIG. 13 illustrates a top view of a core that can be used with the composite structure assembly of FIG. 1.

FIG. 13 illustrates a top view of a core 102 that can be used with the composite structure assembly 100 (shown in FIG. 1). In this embodiment, the cells 108g of the first cell layer 110 are shaped as interconnected hexagons, while the cells 108h of the second cell layer 111 are also shaped as interconnected hexagons that are directionally shifted with respect to the cells 108g to provide an offset therebetween. As shown, the offset between the first and second cell layers 110 and 111 provides a fluid path between an internal chamber 118g of each cell 108g of the first cell layer 110 and internal chambers $118h^1$, $118h^2$, and $118h^3$ of three respective cells 108h of the second cell layer 111, and vice versa.

In at least one embodiment, the core 102 may include openings, such as slits, formed through cell walls (such as walls 116 shown in FIG. 2). The openings allow fluid communication between neighboring cells. The openings may be formed during a forming process, as opposed to a separate and distinct cutting operation that occurs after the forming process. Openings may be formed in walls of any of the embodiments described herein.

Figure 14:
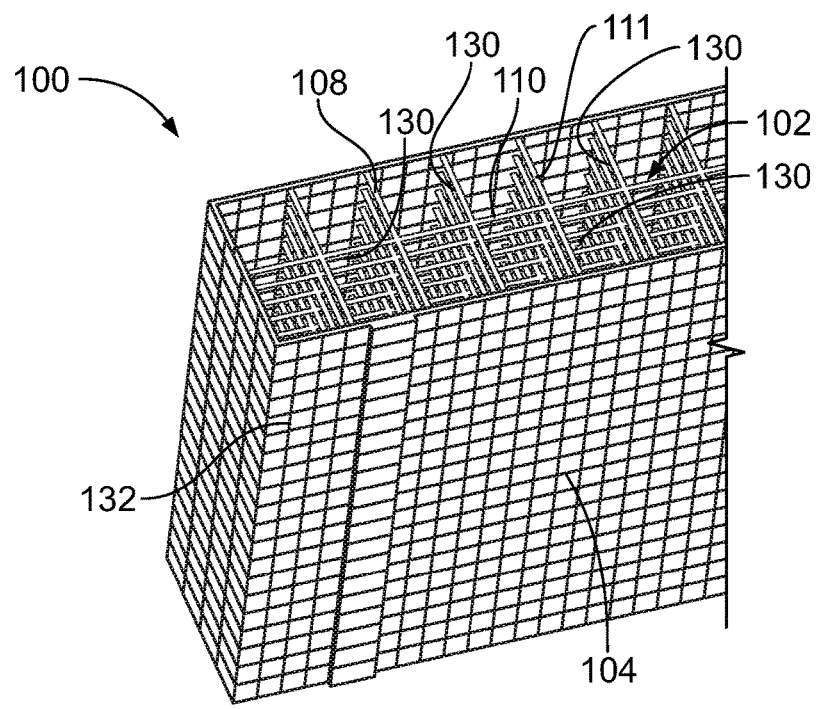
FIG. 14 illustrates a perspective view of a composite structure assembly, according to an embodiment of the present disclosure.

FIG. 14 illustrates a perspective view of a composite structure assembly 100, according to an embodiment of the present disclosure. As shown in FIG. 14, first and second cell layers 110 and 111 are offset with respect to one another, thereby providing a network of fluid passages 130 that fluidly connect the cells 108 together. Further, the offset cell layers 110 provide a repeating support pattern 132 that provides a secure and stable mounting surface for a skin, such as a first skin 104. For example, by offsetting the first and second cell layers 110 and 111 (and others) with respect to one another, additional structural features (for example, cross members) are provided where spaces would normally be if the cell layers were aligned with one another. The additional structural features provide structural supports that prevent, minimize, or otherwise reduce inward bowing, sagging, bending, or the like of the skin 104.

Figure 15:
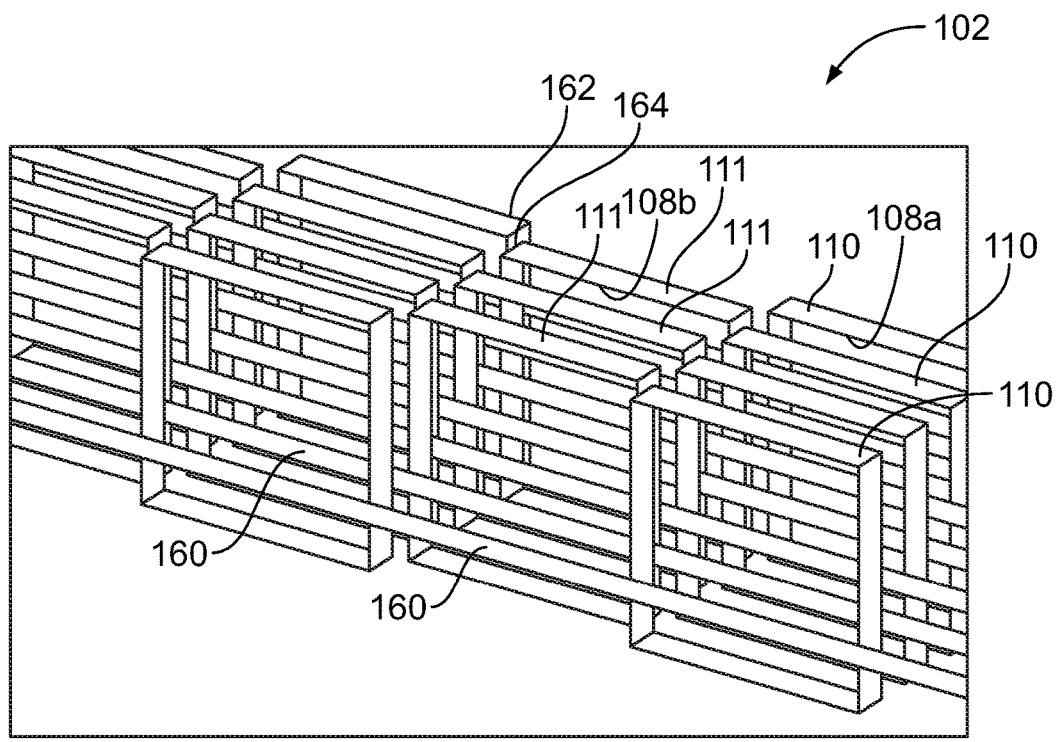
FIG. 15 illustrates a perspective view of a core, according to an embodiment of the present disclosure.

FIG. 15 illustrates a perspective view of a core 102 that can be used with the composite structure assembly 100 (shown in FIG. 1). In this embodiment, the core 102 includes a plurality of first cell layers 110 secured to a plurality of second cell layers 111, as described herein. Connecting beams 160 may tie the first cell layers 110 and the second cell layers 111 together. As shown, the first cell layers 110 are offset with respect to one another, such that the cells 108a (for example, flutes) of the first cell layers 110 are staggered in relation to the cells 108b (for example, flutes) of the second cell layers 111. For example, end walls 162 of the first cell layers 110 may abut against opposite end walls 164 of the second cell layers 111, thereby providing an interconnected structure that reduces longitudinal gaps between the first cell layers 110 and the second cell layers 111. The interconnected end-to-opposite-end relationship between the first cell layers 110 and the second cell layers 111 provides structural supports for skins, which prevent, minimize, or otherwise reduce inward bowing, sagging, bending, or the like of the skin. Further, the offset nature of the first and second cell layers 110 and 111 provides fluid paths between the cells 108a and 108b. That is, the interconnected, but offset nature of the first and second cell layers 110 and 111 provides a repeating, uniform support pattern for the skin.

Referring to FIG. 3-15, by offsetting adjacent cell layers from one another (such as through rotational, directional (for example, linear), or shape offsetting), fluid paths are formed between cells of adjacent cell layers. As such, the offset adjacent cell layers cause the cells (for example, the internal chambers of the cells) to be in fluid communication with one another. The offset nature between adjacent cell layers interconnects the cells of the core, thereby allowing fluid flow therebetween. The interconnected cells allow liquid to drain out of the core. As another example, the interconnected cells allow gas (such as Nitrogen) to flow through the cells to provide an inert seal. Also, the interconnected cells allow for pressure equalization among the cells of the core, thereby reducing the possibility of face sheets disconnecting from portions of the core. As another example, the interconnected cells allow for distributed air flow through the core.

Figure 16:
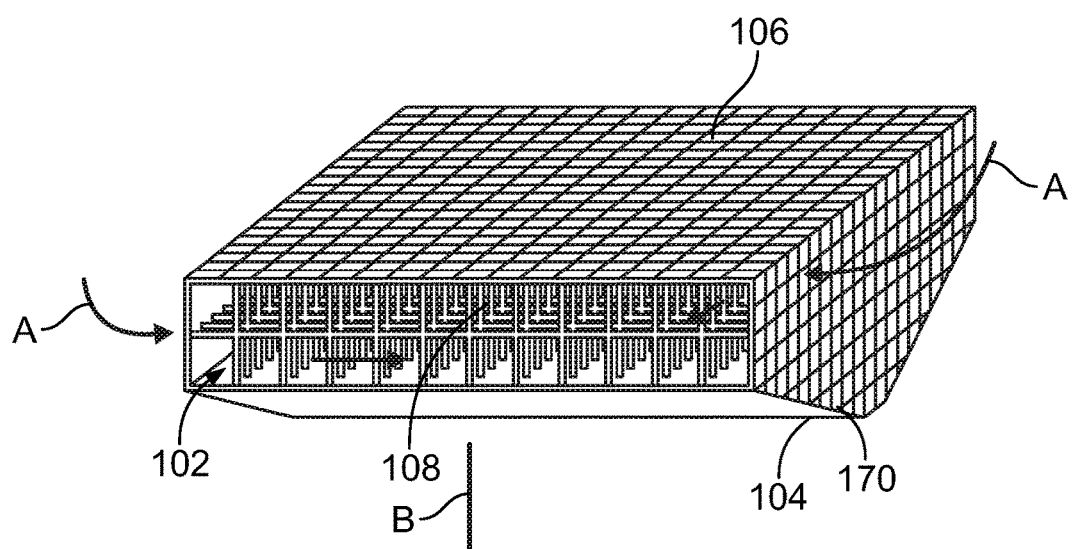
FIG. 16 illustrates a perspective view of a composite structure assembly, according to an embodiment of the present disclosure.

FIG. 16 illustrates a perspective view of a composite structure assembly 100. The composite structure assembly 100 is formed as described herein. The core 102 may be formed as a desired shape, and may provide a ramped outer surface 170 that supports the skin 104. The cells 108 of different cell layers are in fluid communication with one another due to offsetting, as described above. Because the internal chamber of the cells 108 are fluidly connected to one another, fluid (such as water) may pass through the cells 108 in the directions of arrows A, and drain out of the composite structure assembly 100 in the direction of arrow B. The fluid does not become trapped within closed cells.

Figure 17:
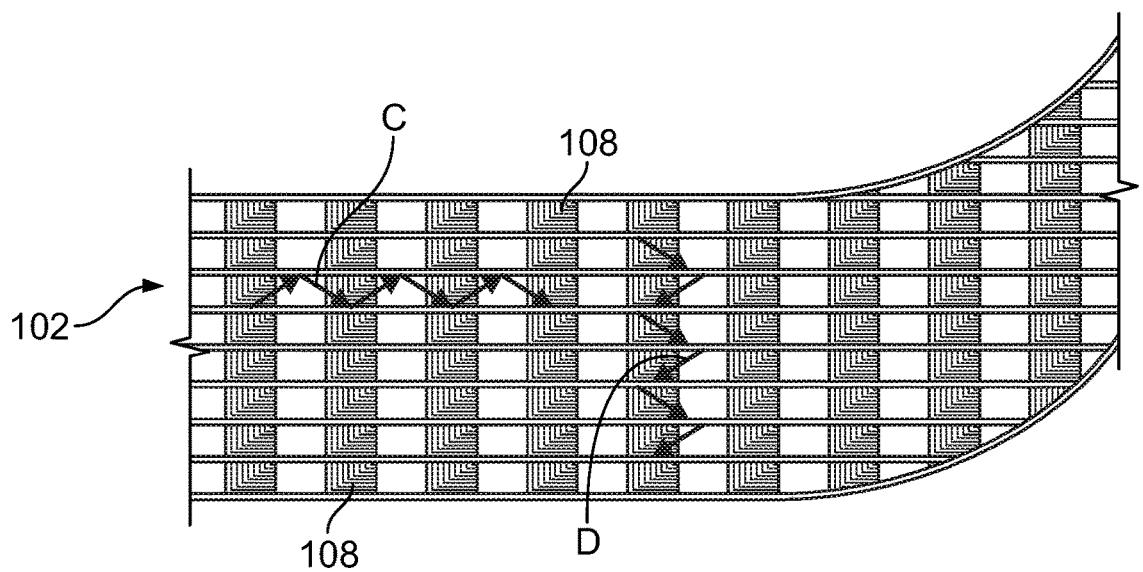
FIG. 17 illustrates a lateral view of a core, according to an embodiment of the present disclosure.

FIG. 17 illustrates a lateral view of a core 102, according to an embodiment of the present disclosure. The cells 108 of different cell layers are in fluid communication with one another through the offset nature between adjacent cell layers. As such, fluid (such as a gas) may horizontally and vertically flow through the core 102 in the direction of arrows C and D. Such as a core 102 could be used in a tank containing liquid or gas.

Figure 18:
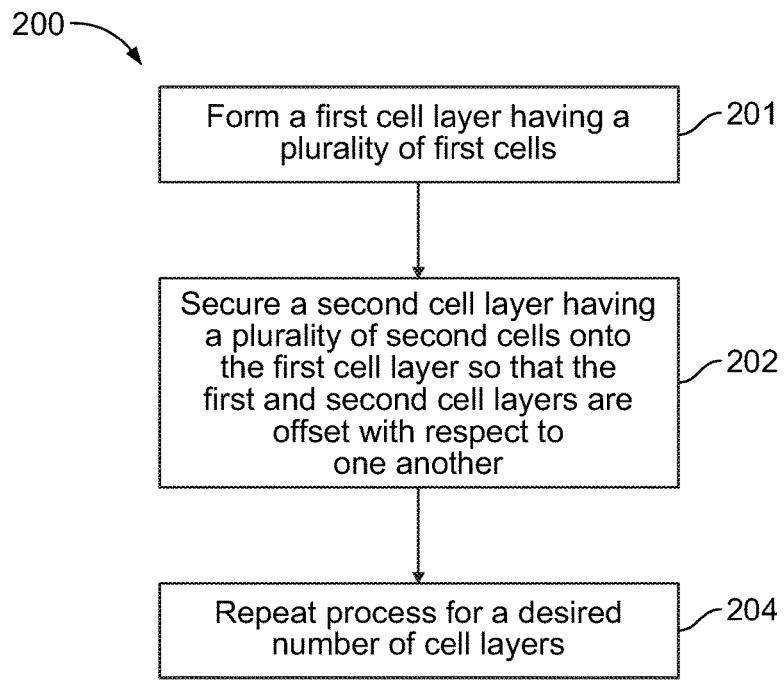
FIG. 18 illustrates a flow chart of a method of forming a core of a composite structure assembly, according to an embodiment of the present disclosure.

FIG. 18 illustrates a flow chart of a method of forming a core of a composite structure assembly 100 (shown in FIGS. 1 and 14). The method 200 begins at 201, at which a first cell layer having a plurality of first cells is formed. At 202, a second cell layer having a plurality of second cells is secured onto the first cell layer so that the first and second cell layers are offset (such as directionally, rotationally, and/or via shape differences) with respect to one another. At 204, the process is repeated for a desired number of cell layers within the core. In at least one embodiment, an additive manufacturing (such as fused filament fabrication, selective laser sintering, stereolithography, or the like) may be used as a process to form the core of the composite structure assembly.

In at least one embodiment, 201 may include 19. forming the first cell layer by providing a plurality of parallel first cross members that define the plurality of first cells. The second cell layer may be formed by providing a plurality of parallel second cross members that define the plurality of second cells.

In at least one embodiment, each of the plurality of first cells are fluidly coupled with at least two of the plurality of second cells. Further, each of the plurality of second cells are fluidly coupled with at least two of the plurality of first cells.

In at least one embodiment, 202 may include offsetting the first cell layer with respect to the second cell layer. The offsetting may include one or more of: rotationally offsetting the first cell layer with respect to the second cell layer, linearly offsetting the first cell layer with respect to the second cell layer, or offsetting the first cell layer with respect to the second cell layer through a difference in one of both of shape or size between the plurality of first cells and the plurality of second cells.

In at least one embodiment, 202 may include staggering the plurality of first cells in relation to the plurality of second cells to provide increased structural support for a skin.

The method 200 may also include orientating the plurality of parallel first cross members to be perpendicular to the plurality of parallel second cross members. The method 200 may also include linearly shifting the plurality of parallel first cross members in relation to the plurality of parallel second cross members. The method 200 may also include securing at least one skin to the composite core.

Figure 19:
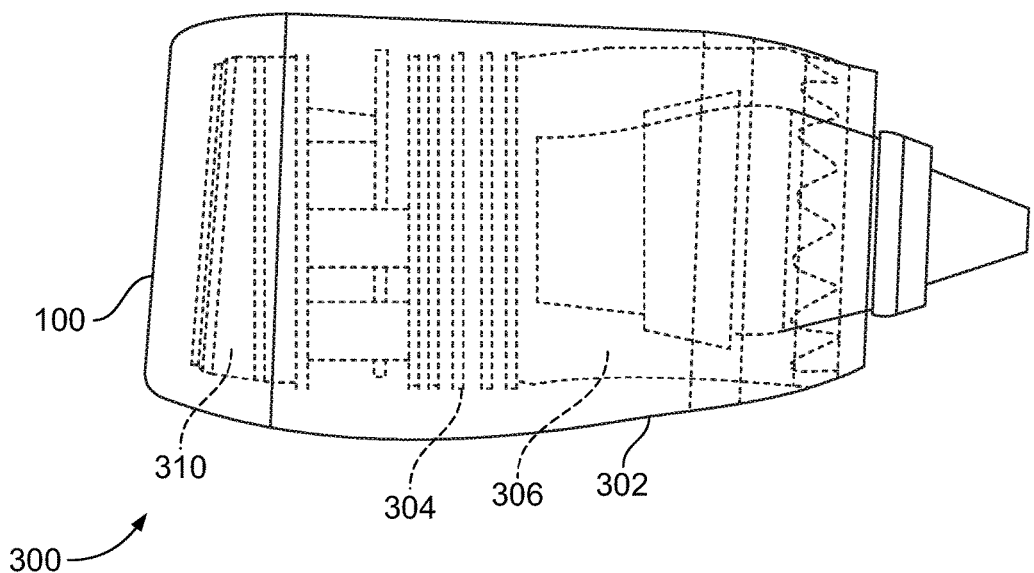
FIG. 19 illustrates an internal view of an aircraft engine, according to an embodiment of the present disclosure.

FIG. 19 illustrates an internal view of an aircraft engine 300. The aircraft engine 300 includes a main housing 302 that retains a fan 304, an engine 306, and a composite structure assembly 100 (including an acoustic core), such as an acoustic inlet barrel, positioned proximate to an air intake inlet 310 of the aircraft engine 300. The composite structure assembly 100 may be formed as described above. Various other portions of the main housing 302 may be formed from composite structure assemblies, including acoustic cores, as described herein. Embodiments of the present disclosure may be used to form various composite components, such as acoustic inlet inner barrels, exhaust acoustic treatments, plugs, nozzles, thrust reversers, bypass ducts, walls, panels, nacelles, wing-to-body fairings, landing gear components, fuel tanks, structural supports, inner and/or outer structural features, and the like.

Referring to FIGS. 1-19, embodiments of the present disclosure provide a composite structure assembly that allows fluid to flow between core cells. Further, the composite structure assembly allows for fluid drainage therethrough. Also, embodiments of the present disclosure provide efficient systems and methods of forming a composite structure assembly that allows for fluid flow between cells. Accordingly, while the composite structure assembly 100 is shown for use in an engine 300 in FIG. 19, the composite structure assembly 100 and/or the core 102 can be used in various other structures, such as a structure for containing a liquid and/or a gas. For example, in at least one embodiment, the composite structure assembly 100 and/or the core 102 forms, or is used as part of, a fuel tank. In one fuel tank example, different types of composite structure assembly 100 and/or the core 102 is used at different parts of the fuel tank (e.g., the core 102 shown in FIG. 17 is used around corners of a fuel tank and core 102 from FIGS. 2-16 is used in walls of the fuel tank).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite structure assembly, comprising:
   a composite core including a first cell layer having a plurality of first cells and a second cell layer having a plurality of second cells, wherein the first cell layer is adjacent to the second cell layer, and wherein the plurality of first cells are fluidly interconnected with the plurality of second cells; and
   a plurality of connecting beams that connect the first cell layer to the second cell layer.

2. The composite structure assembly of claim 1, wherein each of the plurality of first cells is in fluid communication with at least two of the plurality of second cells, and wherein each of the plurality of second cells is in fluid communication with at least two of the plurality of first cells.

3. The composite structure assembly of claim 1, wherein the first cell layer is offset with respect to the second cell layer.

4. The composite structure assembly of claim 3, wherein the first cell layer is rotationally offset with respect to the second cell layer.

5. The composite structure assembly of claim 3, wherein the first cell layer is linearly offset with respect to the second cell layer.

6. The composite structure assembly of claim 3, wherein the first cell layer is offset with respect to the second cell layer through a difference in one of both of shape or size between the plurality of first cells and the plurality of second cells.

7. The composite structure assembly of claim 1, wherein the first cell layer comprises a plurality of first cross members that define the plurality of first cells, wherein the first cross members are parallel to one another.

8. The composite structure assembly of claim 7, wherein the second cell layer comprises a plurality of second cross members that define the plurality of second cells.

9. The composite structure assembly of claim 8, wherein the plurality of first cross members are perpendicular to the plurality of second cross members.

10. The composite structure assembly of claim 8, wherein the plurality of first cross members are linearly shifted in relation to the plurality of second cross members.

11. The composite structure assembly of claim 8, wherein each of the plurality of first cross members differs in one or both of size or shape from each of the plurality of second cross members.

12. The composite structure assembly of claim 1, wherein the plurality of first cells are staggered in relation to the plurality of second cells to provide increased structural support for a skin.

13. The composite structure assembly of claim 1, further comprising at least one skin secured to the composite core.

14. A method of forming a composite structure assembly, the method comprising:
   forming a first cell layer having a plurality of first cells;
   forming a second cell layer having a plurality of second cells; and
   securing the first cell layer to the second cell layer to form a composite core, wherein the first cell layer is adjacent to the second cell layer, wherein the securing fluidly interconnects the plurality of first cells with the plurality of second cells, and wherein the securing comprises connecting the first cell layer to the second layer with a plurality of connecting beams.

15. The method of claim 14, wherein the securing comprises:
   fluidly coupling each of the plurality of first cells with at least two of the plurality of second cells; and
   fluidly coupling each of the plurality of second cells with at least two of the plurality of first cells.

16. The method of claim 14, wherein the securing comprises offsetting the first cell layer with respect to the second cell layer.

17. The method of claim 16, wherein the offsetting comprises one or more of: rotationally offsetting the first cell layer with respect to the second cell layer, linearly offsetting the first cell layer with respect to the second cell layer, or offsetting the first cell layer with respect to the second cell layer through a difference in one of both of shape or size between the plurality of first cells and the plurality of second cells.

18. The method of claim 14, wherein the forming the first cell layer comprises providing a plurality of parallel first cross members that define the plurality of first cells, and wherein the forming the second cell layer comprises providing a plurality of parallel second cross members that define the plurality of second cells.

19. The method of claim 18, further comprising orientating the plurality of parallel first cross members to be perpendicular to the plurality of parallel second cross members.

20. The method of claim 18, further comprising linearly shifting the plurality of parallel first cross members in relation to the plurality of parallel second cross members.

21. The method of claim 14, wherein the securing comprises staggering the plurality of first cells in relation to the plurality of second cells to provide increased structural support for a skin.

22. The method of claim 21, further comprising securing at least one skin to the composite core.

* * * * *